Figure 28:
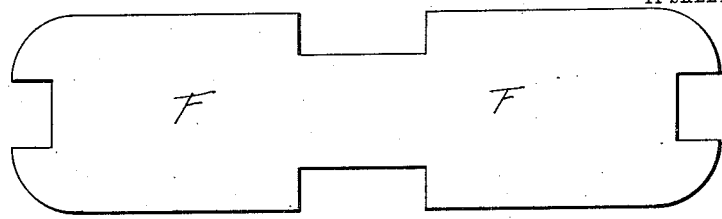

G. J. DORMANDY.
MACHINE FOR FOLDING BLANKS FOR CUFFS, &c.
APPLICATION FILED JAN. 17, 1907.
1,017,040.
Patented Feb. 13, 1912.
11 SHEETS—SHEET 1.
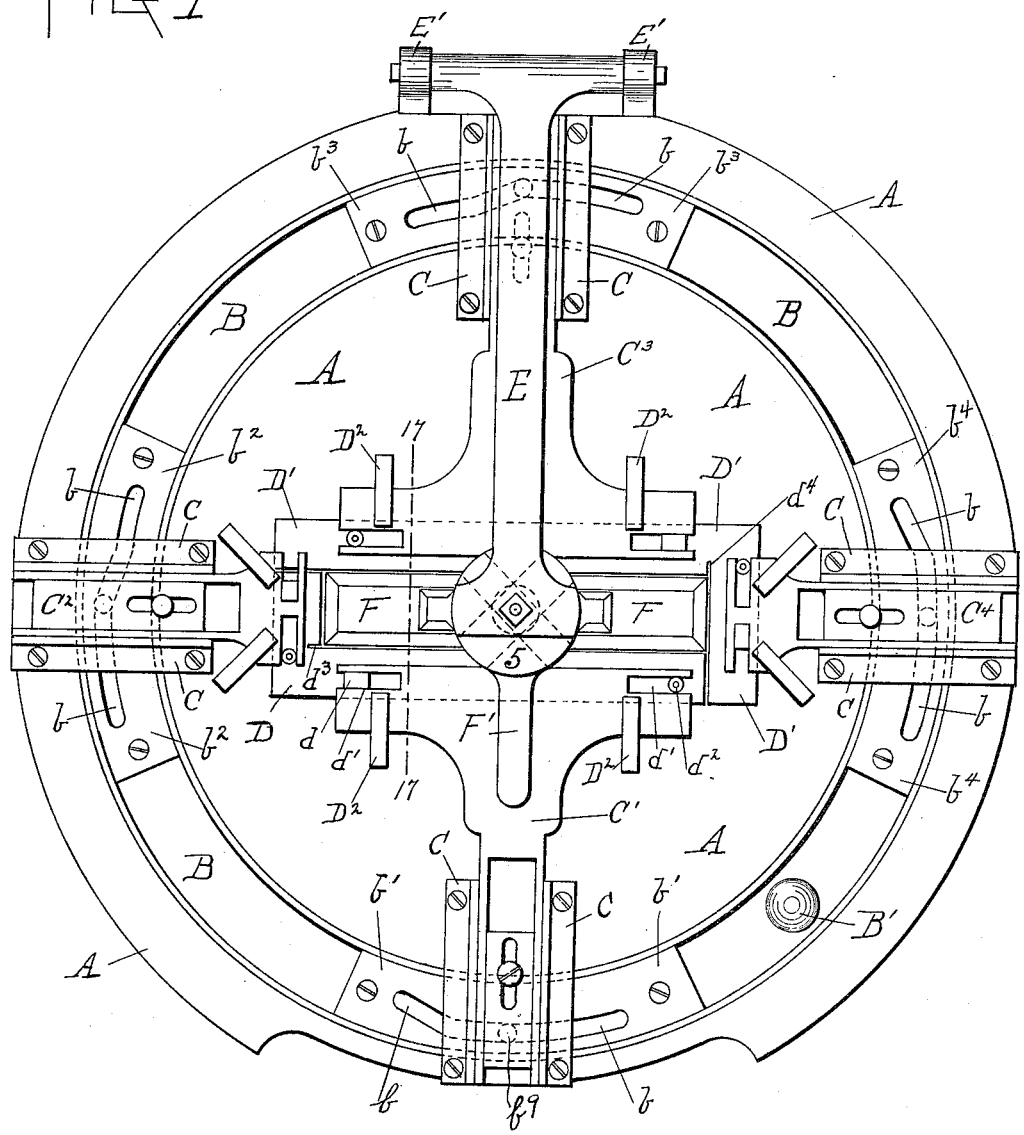
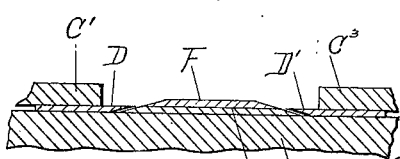

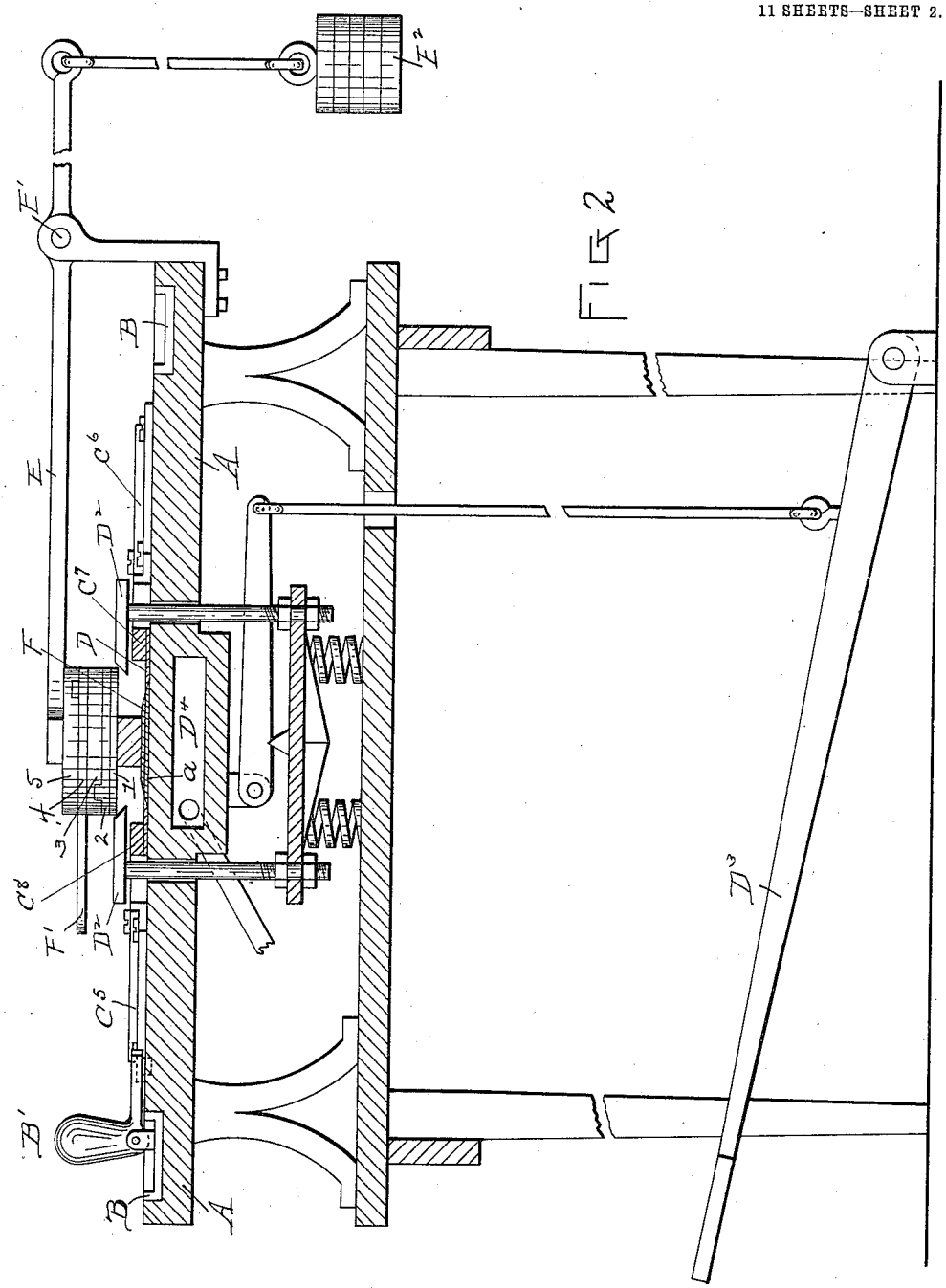

G. J. DORMANDY.
MACHINE FOR FOLDING BLANKS FOR CUFFS, &c.
APPLICATION FILED JAN. 17, 1907.
1,017,040.
Patented Feb. 13, 1912.
11 SHEETS—SHEET 3.
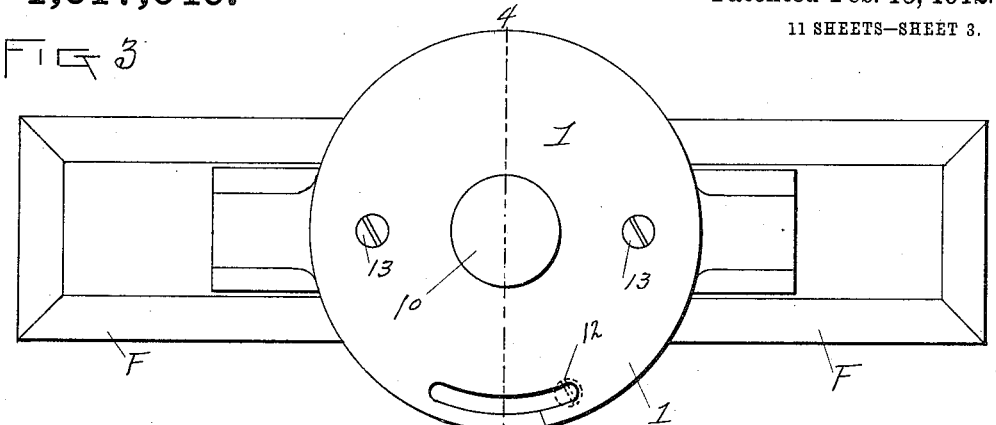
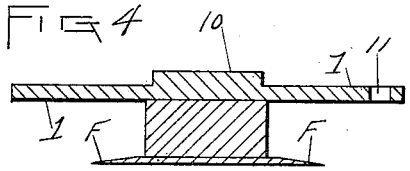
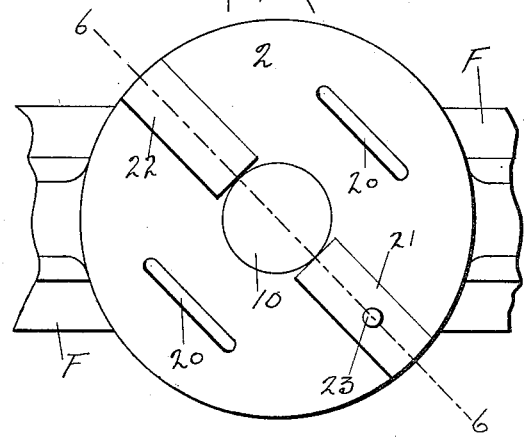
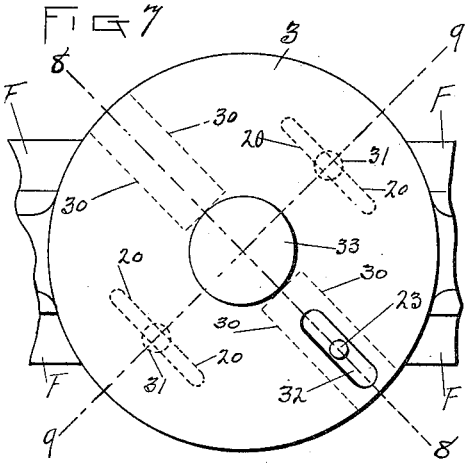
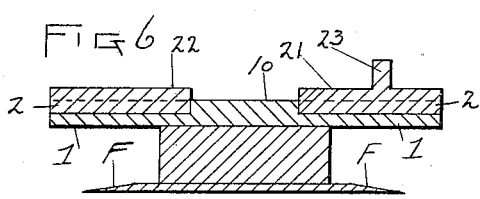
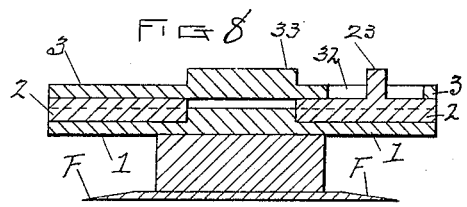
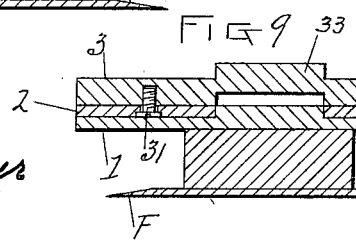

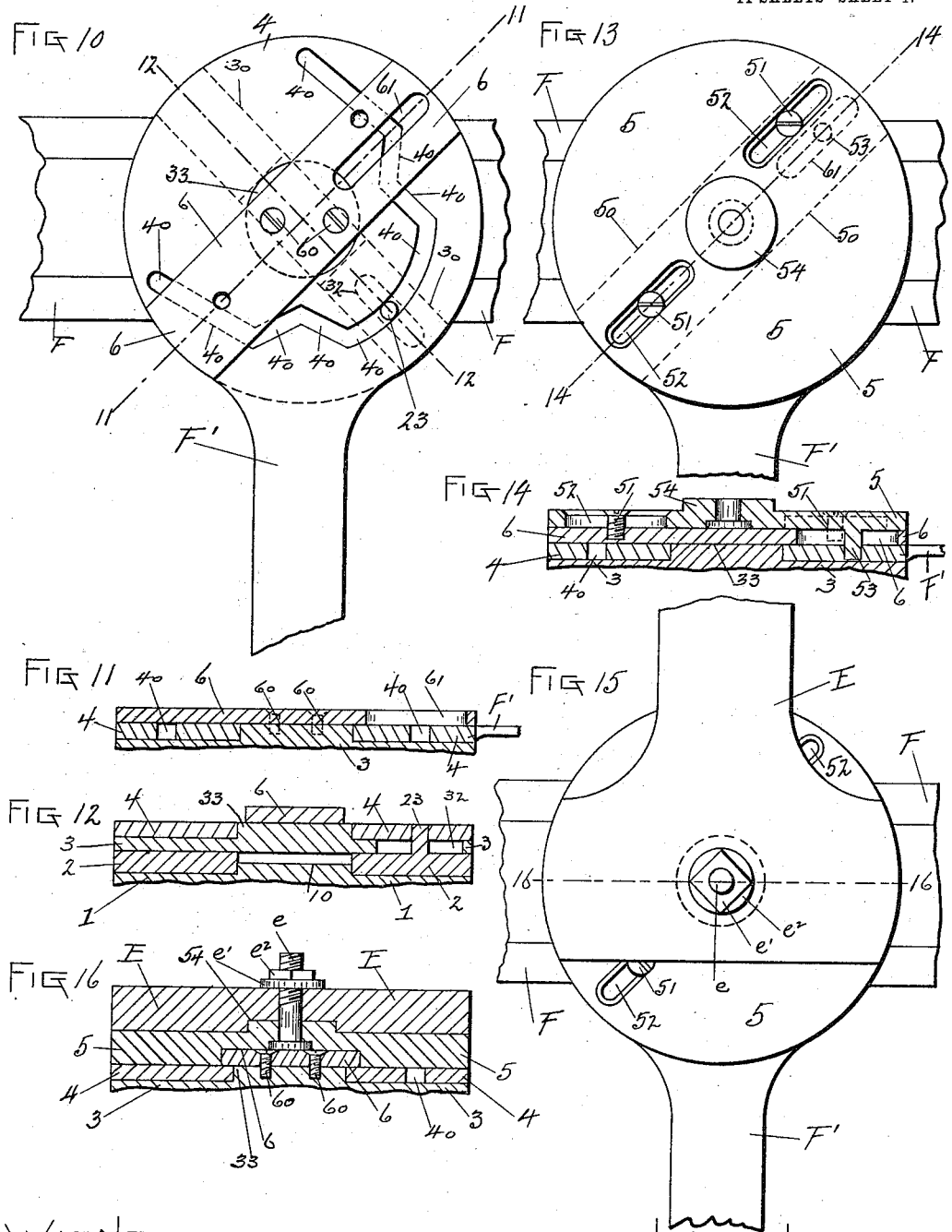

G. J. DORMANDY.
MACHINE FOR FOLDING BLANKS FOR CUFFS, &c.
APPLICATION FILED JAN. 17, 1907.
1,017,040.
Patented Feb. 13, 1912.
11 SHEETS—SHEET 5.
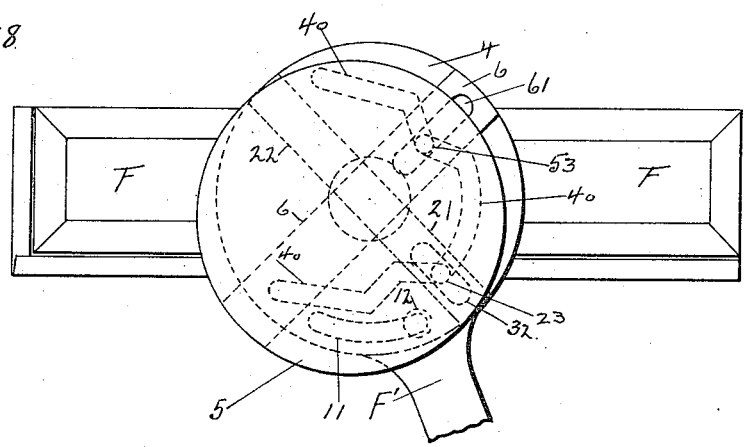
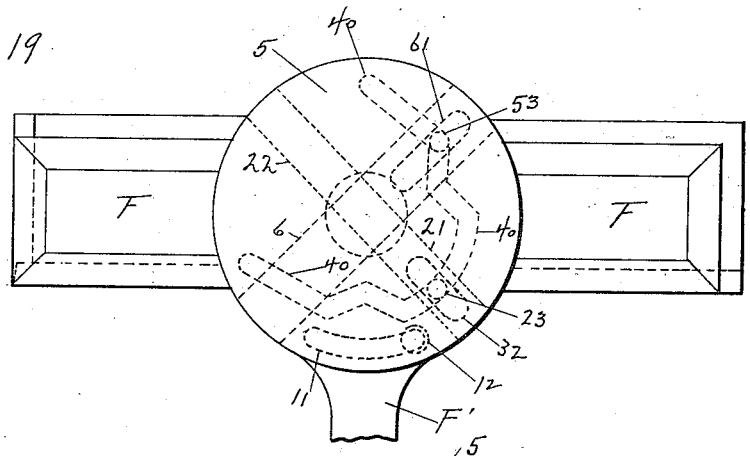
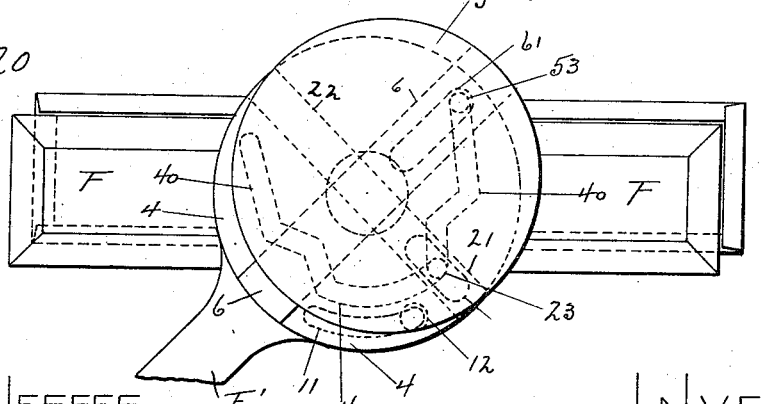

G. J. DORMANDY.
MACHINE FOR FOLDING BLANKS FOR CUFFS, &c.
APPLICATION FILED JAN. 17, 1907.
1,017,040.
Patented Feb. 13, 1912.
11 SHEETS—SHEET 6.
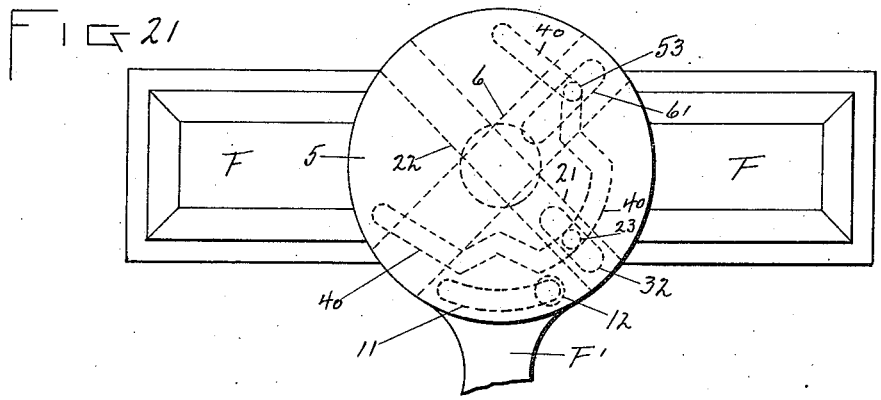
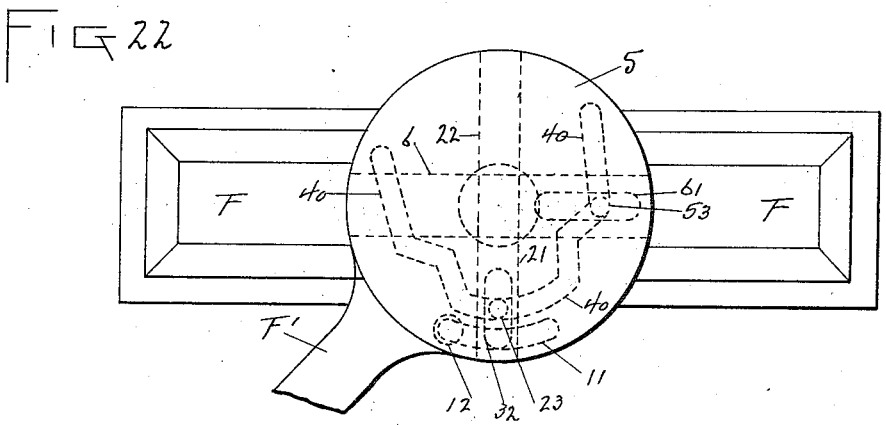
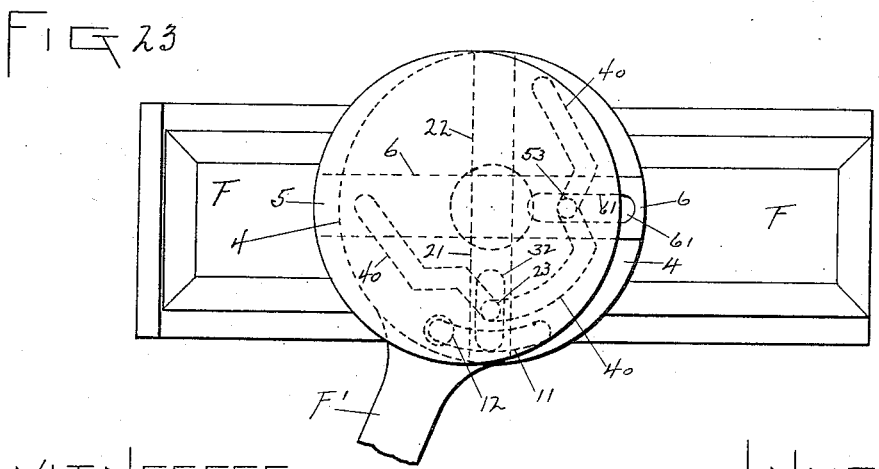
WITNESSES
INVENTOR
Garry J. Dormandy
by his attorneys
Messimer & Campbell

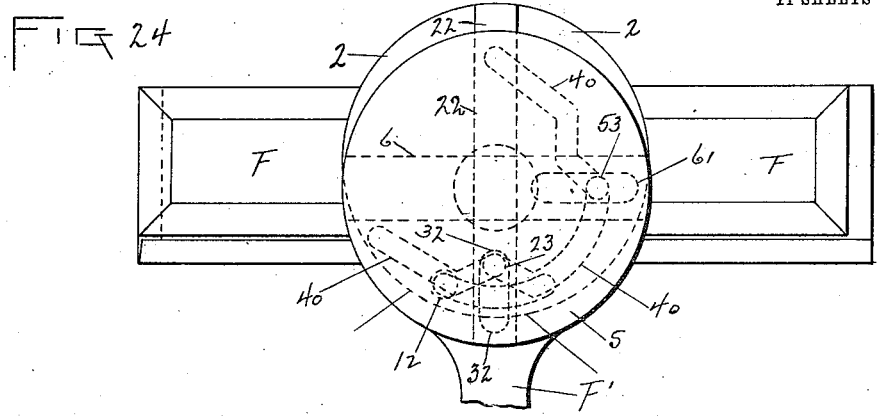
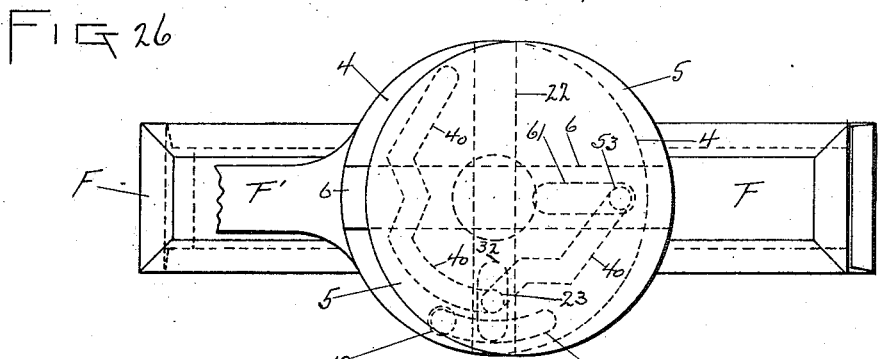
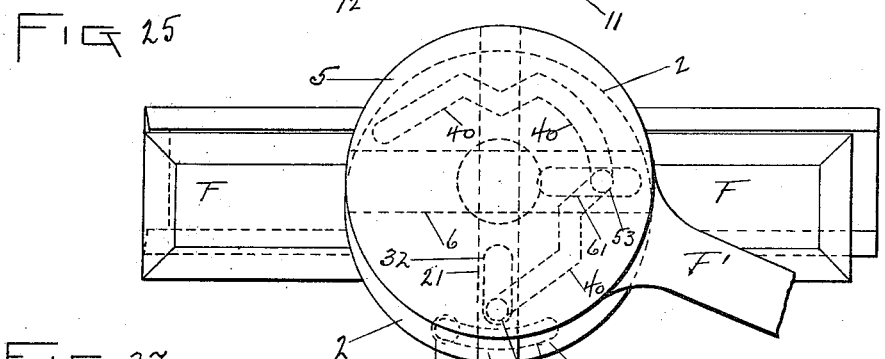
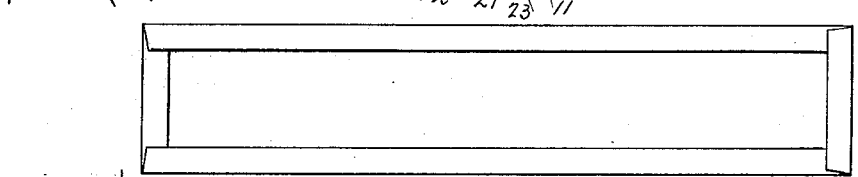

G. J. DORMANDY.
MACHINE FOR FOLDING BLANKS FOR CUFFS, &c.
APPLICATION FILED JAN. 17, 1907.

1,017,040.

Patented Feb. 13, 1912.

11 SHEETS—SHEET 8.

WITNESSES
INVENTOR
Garry J. Dormandy, by his
attorneys, Messimer & Campbell

G. J. DORMANDY.
MACHINE FOR FOLDING BLANKS FOR CUFFS, &c.
APPLICATION FILED JAN. 17, 1907.
1,017,040.
Patented Feb. 13, 1912.
11 SHEETS—SHEET 9.
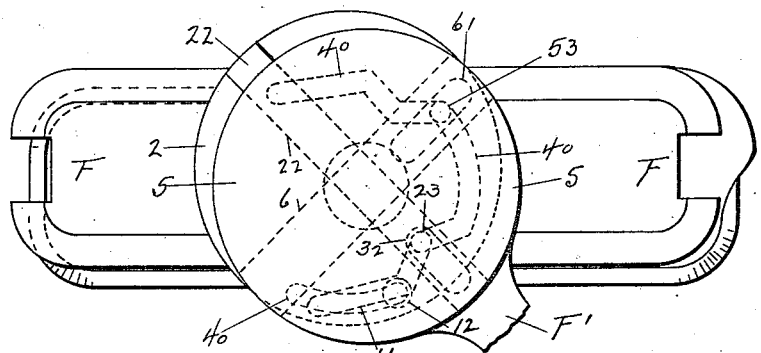
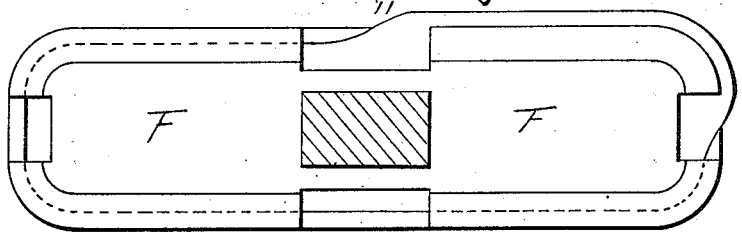
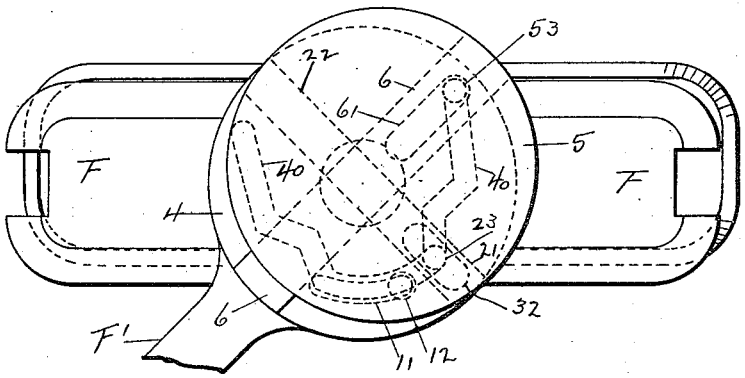
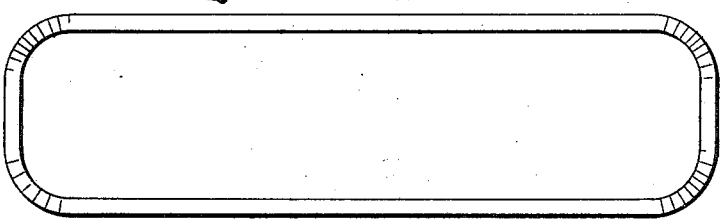
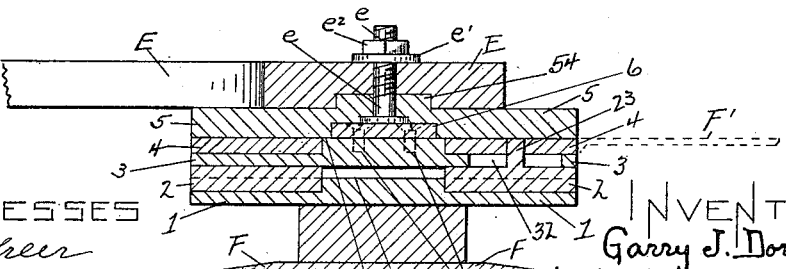
WITNESSES
Wm. T. Greer
Robert L. Messimer
INVENTOR
Garry J. Dormandy
by his attorneys
Messimer & Campbell
COLUMBIA PLANOGRAPH CO., WASHINGTON, D. C.

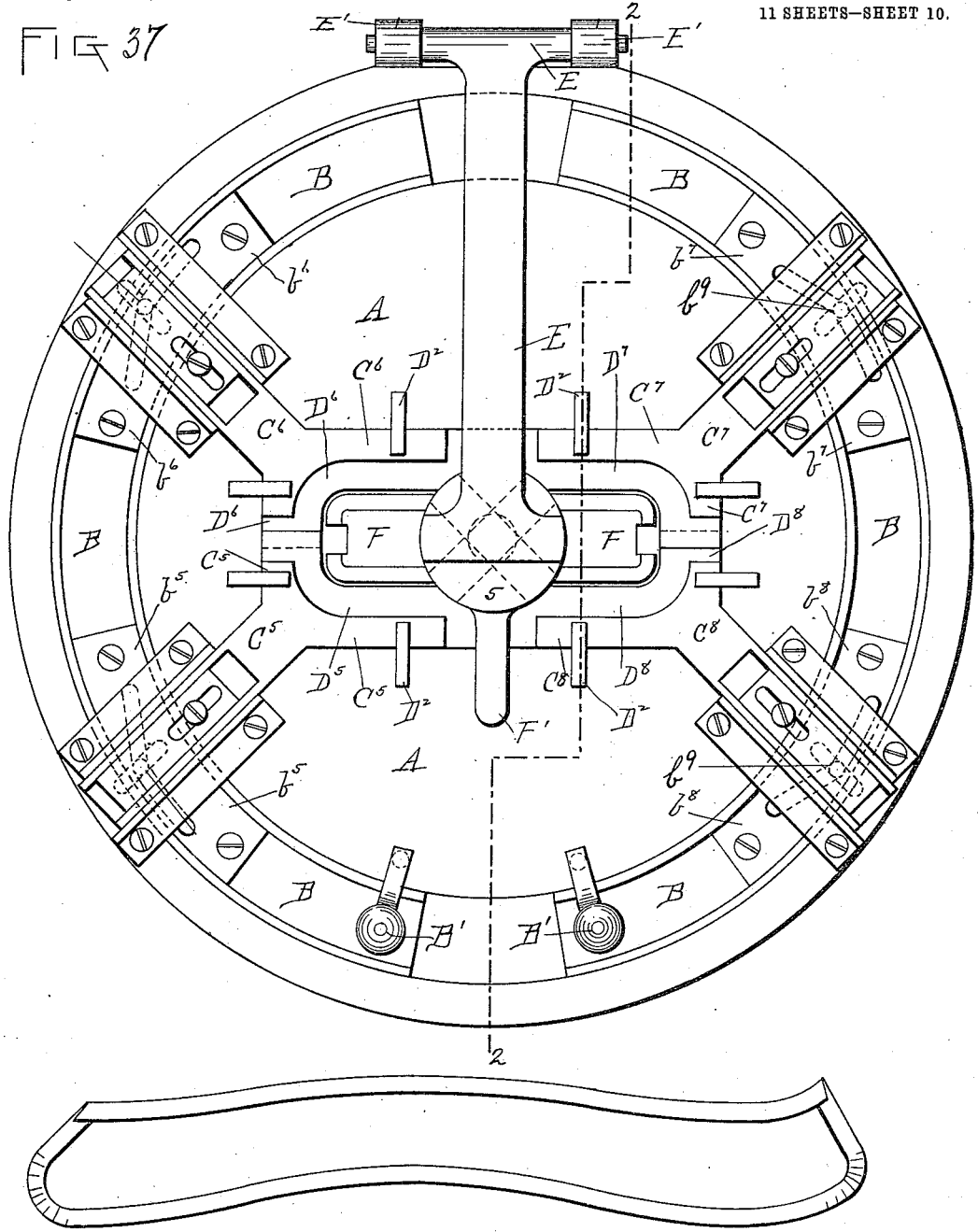

G. J. DORMANDY.
MACHINE FOR FOLDING BLANKS FOR CUFFS, &c.
APPLICATION FILED JAN. 17, 1907.

1,017,040.

Patented Feb. 13, 1912.

11 SHEETS—SHEET 11.

WITNESSES

INVENTOR
Garry J. Dormandy
by his attorneys
Messimer & Campbell

COLUMBIA PLANOGRAPH CO., WASHINGTON, D. C.

UNITED STATES PATENT OFFICE.

GARRY J. DORMANDY, OF TROY, NEW YORK, ASSIGNOR TO THE UNITED SHIRT AND COLLAR COMPANY, A CORPORATION OF NEW YORK.

MACHINE FOR FOLDING BLANKS FOR CUFFS, &c.

1,017,040.    Specification of Letters Patent.    Patented Feb. 13, 1912.

Application filed January 17, 1907. Serial No. 352,745.

To all whom it may concern:

Be it known that I, GARRY J. DORMANDY, a citizen of the United States, residing at Troy, in the county of Rensselaer, State of New York, have invented a new and useful Machine for Folding Blanks for Cuffs and the Like, of which the following is a specification.

My invention relates to machines for infolding the edges of blanks; and more particularly to such blanks as are employed in the preliminary steps of making up a cuff, collar, shirt bosom or the like. These blanks, as is well understood, usually consist of fabric of one or more layers in thickness that are cut to approximately the shape but slightly larger size than the finished article. Blank edge infolding machines of this class usually comprise a bed, or support, which serves for holding the blanks during the folding operations. Besides the bed, or blank support, there is also infolding mechanism which usually consists of a series of horizontally movable infolders that are fitted to the machine in a group surrounding the central portion of the bed and with mechanism by which they may be reciprocated or moved inwardly and outwardly; the inward movements serving to turn over or infold the edges of the blanks, and the outward movements serving to withdraw the folders before the blanks are removed from the machine. The third instrumentality, which will hereinafter be called a templet but is sometimes called a die, is the part which serves, by reason of the conformation of its outlines, to define the form of the folds, and in that way determine the size and shape of the folded blank which is to comprise one face or surface of the finished cuff, collar or shirt bosom. Such templets are usually fitted to the frame of the machine by means of mechanism through which the templet may be elevated and lowered; usually by a swinging movement, although sometimes an arrangement of slides is preferred. The purpose of this mechanism is that the templet may have a positive motion upwardly and downwardly, so that when the blanks have been set in place upon their support, the templet may be brought with absolute accuracy into the proper position for defining the folds; the edge portions of the templet of course coming within the outer edges of the unfolded blanks so that there will be edge portions of blanks extending beyond the edges of the templet. These latter edge portions are the portions which are turned inwardly or infolded by the movement of the infolders. In using the terms horizontally and upwardly and downwardly, it will be understood that these are relative terms employed in order that the invention may be the better described and are not intended to exclude a construction which might be imagined in which the entire structure was tilted or even turned vertically.

The present invention relates to a machine of the class above described. Its objects will appear better during the reading of the specification.

The invention has in mind the advantages of simplification of mechanism and of operation and the attainment of greater accuracy; these and other results being effected by a novel arrangement and principle of operation which is embodied in the specific form of mechanism shown in the drawings to be hereinafter described.

The invention contemplates a blank edge infolding machine of the class above described, in which are comprised a horizontal support for the blanks, together with the infolding mechanism for turning the edges of the blanks over the edges of the templet, and finally a templet and operating mechanism for the templet, the templet and operating mechanism being of novel constructions so as to accomplish results that were never attained with prior machines.

The operating mechanism includes mechanical parts for moving the templet relatively toward and from the blank support so as to bring the templet in proper position in contact with the blanks. It further includes mechanism associated or combined with the mechanism just referred to; which latter mechanism serves to effect relative movements between the support and the templet in horizontal directions.

With the above combination of parts in the preferred embodiment of the invention, is combined an infolding mechanism which is special in the sense that it is adapted to infold less than the whole number of blank edges in one operation and in a subsequent operation other blank edges.

With the use of this invention, after part of the blank edges have been folded over the templet, the latter may be disengaged from the folds and again positioned above the blanks and above the folds already formed, and after the completion of all the folding operation, disengaged from the folds last formed; which dispenses with the need of opening up the folds and also dispenses with the need of a bodily contracting and expanding templet, as has been found almost universally necessary since the use of folding machines in the industry of manufacturing cuffs, collars and shirts began to be extensive.

I will first describe a machine embodying my invention, and will then point out the novel features thereof in the claims.

Eleven sheets of drawings are annexed and form part of this specification. These drawings illustrate three modifications of the invention which will be described separately in the specification. The first modification is shown in Figures 1–17 inclusive, showing one adjustment; and in Figs. 18–21, showing the stages of operation with such adjustment; also Figs. 22–26, showing the stages of operation of a second adjustment.

Figure 39:
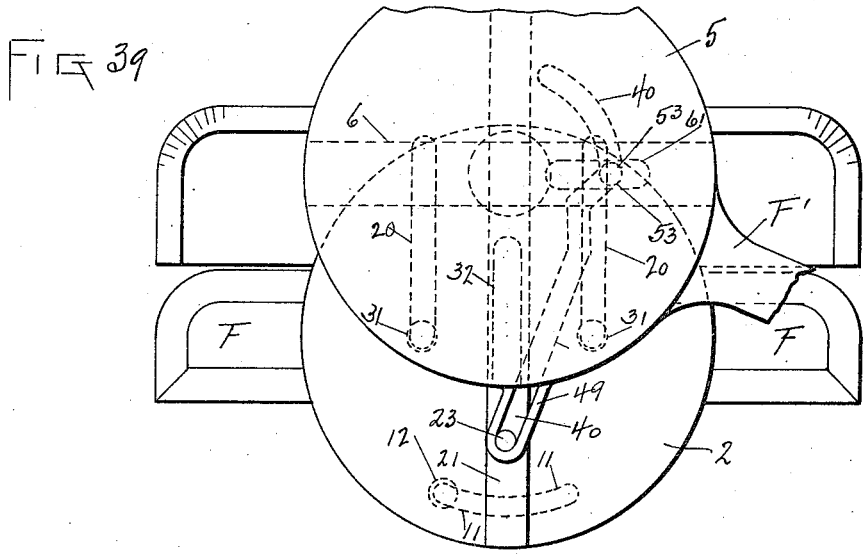
Figure 40:
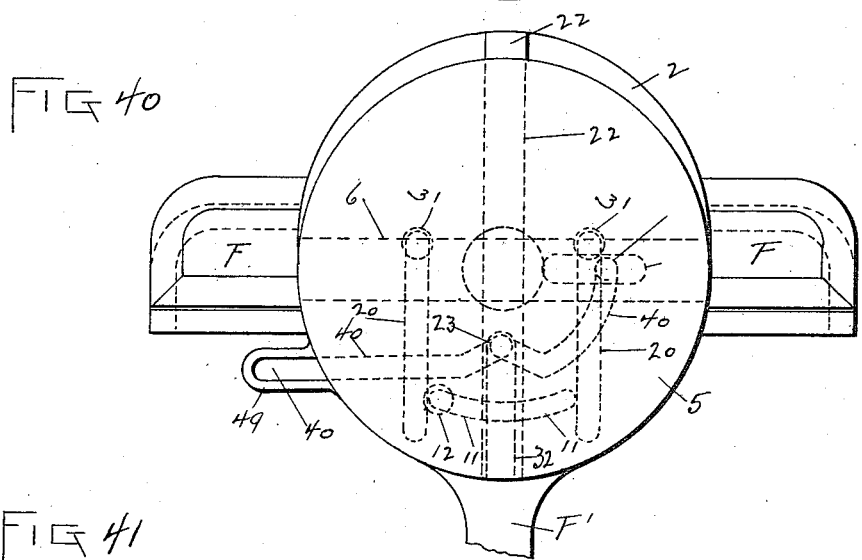
Figure 41:
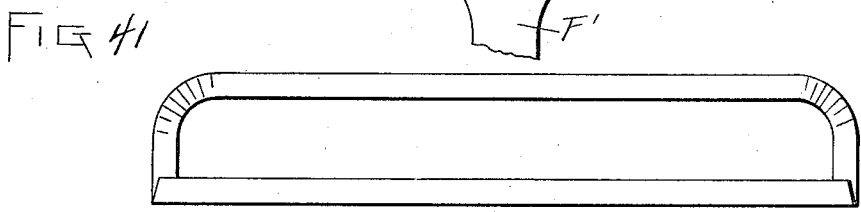

Fig. 1 is a top view of a blank edge infolding machine embodying one form of my invention. For convenience, the invention is shown as applied to a machine wherein the infolder actuating mechanism is substantially in the form of a circular slide; this in itself having been patented to me in prior patents. Fig. 2 is a vertical section of one form of the same taken from front to rear. Fig. 3 is a top view of the templet of Fig. 1 with one of the operating disks, called the first disk, secured thereto. Fig. 4 is a sectional view taken on the plane 4—4 of Fig. 3. Fig. 5 is another top view, showing the same parts as Fig. 3, but with the second disk superimposed upon them. Fig. 6 is a cross sectional view taken on the plane 6—6 of Fig. 5. Fig. 7 is another similar top view with the third disk superimposed. Fig. 8 is a cross section taken on the plane 8—8 of Fig. 7. Fig. 9 is a cross section taken on the plane 9—9 of Fig. 7. Fig. 10 is another similar top view with the fourth disk, to which the operating handle is connected, superimposed. This figure also shows the cross slide 6. Fig. 11 is a cross section taken on the plane 11—11 of Fig. 10. Fig. 12 is a cross section taken on the plane 12—12 of Fig. 10; some of the lower disks being omitted from these two figures because of having been shown in the preceding figures. Fig. 13 is another top view with the fifth disk superimposed; the fifth disk being fixed with relation to the swinging arm which carries the templet. Fig. 14 is a cross section taken on the plane 14—14 of Fig. 13. Fig. 15 is a similar top view with the swinging arm connected above the fifth disk, and this view is substantially an enlargement of the central part of Fig. 1. Fig. 16 is a cross section taken on the plane 16—16 of Fig. 15. Fig. 17 is a detail cross section taken on the plane 17—17 of Fig. 1. Figs. 18, 19, 20 and 21 show in top view and in various stages of operation, the templet and the disk operating mechanism therefor, the swinging arm and other parts of the machine being omitted to avoid confusion. The templet illustrated in the figures above described may be changed in adjustment so as to accomplish a great variety of results. One such adjustment differing from the adjustment shown in Figs. 18–21 is illustrated in Figs. 22–26, which likewise are top views of the templet and operating mechanism in various stages of operation; and Fig. 27 shows the form of folded blank resulting from the operation of the templet when given the adjustment illustrated in Figs. 22–26. The second modification is shown in Figs. 28–37, in which Fig. 37 is a top view of the machine; Fig. 28 is a bottom view of the templet plate detached; and Figs. 29–35 show the various stages of operation of the templet, the same being shown in top detached from the remainder of the machine. Fig. 36 shows the folded blank produced by the second modification. Fig. 38 shows another form of blank which may be folded on the same machine with appropriately shaped templet plates and infolders substituted for those which are illustrated in Fig. 37. A section taken on the plane 2—2 of Fig. 37 will be as seen in Fig. 2. The third modification is illustrated only so far as the templet and its operating mechanism is concerned. Fig. 39 is a top view thereof, and Fig. 40 a similar view at another stage of operation. Fig. 41 shows the resultant folded blank. Fig. 42 is a cross section of the templet and disks of Fig. 1, taken on a vertical plane.

Similar letters of reference are employed to designate corresponding parts in the several figures of the drawings.

*First modification.*—A general statement of this machine may be made as follows: The machine consists generally speaking of a blank support which may preferably be in the form of a solid bed such as has been long known in the prior art, which bed is rigid with the frame of the machine, and is usually constructed with a chambered interior so that appropriate heating means may be employed to keep the bed in such condition that the folds formed in the blanks may be the more easily fixed with a sharp crease. Besides the bed for supporting the blanks, there is a mechanism for operating infolders. The infolders usually consist of one or more parts or plates which are fitted to move inwardly and outwardly toward and from the center of the blank support, and they serve for infolding the edges of the blanks. The operating mechanism may comprise a single part having connections through which movement may be transmitted in an appropriate manner to the several infolders, whereby the latter may be operated simultaneously or in sequence. This infolder operating part has sometimes taken the form of a slide, and in the particular embodiment of my invention which is illustrated in the annexed drawings, I have indicated a slide having a circular form, which form has been patented to me in prior patents. A templet is employed as the part which defines the folds to be formed in the blanks. Positioning means for the templet is provided, and this usually consists in a swinging arm which serves as one of the mechanical connections between fixed bearings and the plate of the templet which actually contacts with the blanks. For raising and lowering the templet a hand lever may be employed, although other means for this purpose are available, as taught by prior patents.

Operating in connection with the templet positioning means just refered to, but in one sense independent thereof, is a mechanism for effecting relative movements between the blank support and the templet in horizontal direction. This mechanism, or part of it, will form part of the train of elements between the templet plate that contacts the blanks and the fixed bearings from which the positioning movements of the templet are effected. In applying such horizontal-movement-producing mechanism, I prefer to locate it intermediate of the extremity of the swinging templet-carrying arm and the plate which serves to define the folds of the blank. With this arrangement, while the horizontal movements of the templet are taking place, the templet-carrying arm may be substantially stationary. In this way I keep independent of each other, in one sense, the two templet operations.

Among the mechanical elements intermediate the templet-carrying arm and the fold-defining plate, I prefer to include a handle extending forwardly, which is a convenient means (when power is not employed) for effecting the aforesaid horizontal movements of the fold-defining plate. Merely for convenience the same handle may be used to lower and raise the templet in the operation of positioning it upon and removing it from the blanks. Certain other mechanical elements are operatively connected intermediate the fold-defining plate and the templet-carrying arm. These and their mode of operation will be fully described hereinafter.

The horizontal movements of the templet may be in reverse directions along a single line of movement, or they may be along two different lines of movement, and in either case effected and controlled by the operating handle. The infolder operating mechanism is preferably one in which cams are employed that are capable of actuating one or two or any number less than the whole, and subsequently another or others of such infolders so that the edges of the blanks are infolded in succession. With this arrangement thus generally described, after the templet is positioned on the blanks and one or two or less than the whole number of blank edges are infolded, the templet may then, during the pauses of the operation of the infolders, be horizontally withdrawn from the folds already formed, which disengages the templet from the blanks and permits it to be again positioned above the blanks and above the folds already formed (and preferably in actual contact with the folds already formed) so that other blank edges may, in a second operation, be infolded, and after the completion of the folding, the templet disengaged from the completely folded blank without the need of opening up any of the folds, nor yet of bodily contracting the templet.

*Description of parts.*—A represents the bed or bed plate of the machine shown in Figs. 1–27; and its function is mainly to serve as a support for the blanks to be infolded. It also incidentally serves as a bearing for the infolders and their guiding and actuating mechanism. The bed is of a generally circular form, as shown in prior patents to me. The infolder actuating part is a slide which is of a generally circular form. As a convenient mode of producing a slide of this form, I have provided a ring or annulus B of metal which fits, so as to be capable of oscillating, within a corresponding annular groove or guide formed upon or in the bed plate and preferably near the exterior edge thereof. This ring B is provided with a handle B′, by which the ring may be given to and fro movements when the infolders are being actuated. At suitable points on the ring B are cams which may be removably or adjustably secured to the ring, as set forth in my prior patents. These cams are the infolder actuating cams. Each cam is provided with a slot at $b$ having eccentric portions, and usually concentric portions as well, the arrangement and operation of which will hereinafter appear. In the form of machine shown in Fig. 1, four of these cams $b'$, $b^2$, $b^3$ and $b^4$, are provided, and they act through pins $b^9$ upon four infolder slides $C'$, $C^2$, $C^3$, $C^4$, which in turn actuate the infolders. These infolder slides are fitted to move inwardly and outwardly toward a common center or area upon which the blanks to be infolded are intended to rest. For guiding the infolder slides a series of fixed guides C may be employed. These slides are not new in themselves, and consist merely in L-shaped pieces of metal securely bolted to the bed plate at proper points around the periphery of the machine; the infolder slides moving longitudinally to and fro between the guide plates in a manner that has been fully explained in my prior patents, which also explain how the guides and the infolder actuating cams may be made removable or adjustable with respect to their position around the bed of the machine, wherefore these features need not be now referred to.

At the inner ends of the infolder slides are located infolders which may be moved inwardly when the operating ring is oscillated in one direction, and moved outwardly by a different oscillation of the ring. The form of the infolders will of course vary according to the size and contour of the cuff or other article to be manufactured from the blanks. Generally speaking, there will be as many infolders as there are edges to be infolded. Conveniently, there may also be an arrangement whereby each infolder is operated from its individual actuating cam and infolder slide. In the embodiment shown in Fig. 1, however, wherein square blanks for a square cuff are to be infolded, I have employed the device of combining into one integral plate the infolders for one side and an adjacent end. This in effect affords a single L-shaped infolder corresponding to two of the sides of the blank. There will be another L-shaped infolder for the other two sides. These infolders are designated by the letters D and D'.

I will now describe the connection between the infolders and their operating mechanisms. Referring to the L-shaped infolder D corresponding with the left hand and front sides of the blanks, it will be seen to have a sliding connection with the front infolder slide C'. This connection is in the form of a block $d$ engaging a slot formed at $d'$ in the infolder slide; and a pin and roller $d^2$ engaging a similar slot $d'$ at the other end. This causes the infolder to move inwardly and outwardly in conjunction with the front infolder slide and yet permits a sliding movement of the infolder to the left and right. This left and right movement is caused by the infolder slide $C^2$ at the left of the machine, which is likewise slidingly connected to the end of the L-shaped infolder. This arrangement, it will be seen, permits an endwise movement which will be independent of the sidewise movement of the infolder. In operating this infolder it will usually be first moved from the left toward the right. This will form an infold on the left end of the blank, and at the same time the small slot $d^3$ will pass over the infold as it is formed; and subsequently the infolder will be moved from the front toward the rear, forming the side fold which will be superimposed upon the end fold, resulting in the production of a lock corner. The slot $d^4$ in the other L-shaped infolder D' is arranged in a different direction, because the sequence of the formation of the folds is intended to be reversed.

It will now be understood why there are eccentric and concentric portions in the infolder actuating cams, viz., so as to bring about the proper sequence in the formation of the infolds. It will be convenient now to pass to a description of the templet and its operating mechanism, after which the purpose of operating the infolders in sequence will be more clearly understood. It should, however, be mentioned here that in conjunction with the infolding mechanism above described, will be provided a pressing or creasing mechanism, which may be of any usual design, such as that consisting in presser heads $D^2$ which are located above the infolders and are suitably connected (see Fig. 2) to a depressing treadle $D^3$ or other device capable of applying a high creasing pressure in the neighborhood of a ton or more on top of the infolders so as to squeeze and crease the folds of the blanks between the infolders and the bed plate; which latter may, to increase the effectiveness of the creasing operation, be heated as by the steam chamber $D^4$ as set forth in prior patents to me.

*Description of templet.*—Primarily, the templet is a part or plate which is usually substantially flat and which has an outline that is of the form which the folded blank and the finished cuff or other article is to assume. The edge portions of the templet which actually serve to define the folds in the process of their formation, are preferably formed of very thin metal and are so constructed as to contact directly with the material of the blanks during the time that the edges of the blanks are being folded over the edges of the templet. This templet is part of the entire machine, and it must therefore have operative connections of some sort by which its relation to the frame and other parts of the machine is pre-determined. I prefer that form of connecting mechanism which includes a swinging lever pivoted upon fixed bearings of some sort at one portion of its length and connected directly or indirectly with the templet at another portion. The bearings in this case will be the ordinary rotary bearing consisting of a sleeve of bearing metal engaged by cylindrical pins or shafts.

At some point or points intermediate of the fixed bearing for the templet and the templet itself, or rather that portion of the templet which actually contacts with the blanks, there will be provided a mechanism having certain peculiarities of operation which I will now attempt to describe. This operation, as already explained, is in one sense independent of the upward and downward movement of the templet. The operation referred to is one controlled by a handle or similar controller, by which the templet, while resting upon or while near the blanks upon the bed of the machine, may be given horizontal movements in reverse directions; horizontal in this case meaning substantially parallel with the plane of the bed as distinguished from being vertical or at right angles to the bed. This intermediate mechanism for producing horizontal templet movements may be located at any desired point between the fixed bearing and the fold-defining plate of the templet and may be controlled and operated in various modes. I prefer, however, to construct and operate the same according to the following detailed description.
E is a templet-carrying arm.

E', E' are two fixed bearings to which the templet-carrying arm E is journaled so that upward and downward movements may be produced in the arm and the templet which is connected upon the free end of the arm. Any well known means may be employed for causing the elevation and depression of the arm E and a suitable weight E² may be used if desired to hold the same in a normally elevated position.

The mechanism for producing horizontal movements in the fold-defining plate of the templet is located at the forward end of the arm E and will now be described.
The special embodiment which I have illustrated is one in which there are five plates or disks, preferably circular in form, and which are superimposed one upon the other so that when in normal position a substantially solid cylinder is produced which is built up of the five disks. These disks, for the sake of clearness, I will designate the first, second, third, fourth and fifth disks. Before referring to the figures it may be explained that the first or lower disk is fastened permanently and rigidly to the fold-defining plate, which latter is marked F in the drawings. The fifth or upper disk is rigidly connected at the forward end of the templet-carrying arm. The second, third and fourth all have movable or adjustable relation with the first and fifth disks, and when controlled by the handle or other part, form the active mechanism which effects and regulates the before mentioned horizontal movements of the fold-defining plates of the templet.

Referring to Fig. 1, which is a top view, the fifth disk 5 is visible. To the fourth disk 4 is connected a handle F', which is also seen in Fig. 2.

In Fig. 3 is seen a top view of the fold-defining plate F and the first disk 1 which is permanently and rigidly secured by screws 13 to the plate F. Fig. 4 is a cross section, and these two figures show that the first disk has a central lug 10 and a concentric slot at 11.

Passing now to Figs. 5 and 6, the second disk and its relation to the first will be seen. The second disk 2 has a central circular opening which fits over the projection 10 of the first disk. The second disk also has two slots 20, 20 and two opposed lugs 21, 22, which form substantial continuations of each other. The two lugs and the two slots are all parallel with each other and one of the lugs 21 has an upwardly projecting pin 23. The first and second disks are normally secured rigidly together, but this is done by means of a screw 12 which passes through the slot 11 from beneath and enters the second disk; so that by loosening the screw the relative position of the two disks may be changed in angle to the extent of 45 degrees or more. The purpose of this adjustment between the first and second disks will be made apparent in the statement of operation to be hereinafter given.

In the course of building up the mechanism we now come to the third disk, and this is seen in top view in Fig. 7 and in different sectional views in Figs. 8 and 9. The third disk has a groove cut across its lower face, seen in dotted lines at 30, 30, Fig. 7, which groove engages with the already described projections 21, 22 of the second disk. This permits a relative sliding movement between the second and third disks along the broken line of 8—8 Fig. 7. To hold the two disks in mutual face contact, a couple of headed screws or bolts 31 may be passed from below through the slots 20, 20 of the second disk and into the metal of the third disk, as seen in Fig. 9. The third disk also has a slot 32 which is likewise parallel with the grooves 30, and through this slot, as seen in Figs. 7 and 8, the upwardly projecting pin 23 passes. Further, the third disk has a central circular projection 33 similar to the projection 10 of the first disk.

We now come to the fourth disk 4. This is the cam disk and has the operating handle F' secured to it so that the cam may be brought into play by the movements of the handle. The fourth disk is annular, having a central hole which fits over the projection 33 of the third disk, and the third and fourth disks are capable of relative rotary movement. The fourth disk also has a cam slot 40 which has various concentric and eccentric portions, the operation of which will appear hereinafter. As seen in Fig. 10 and the cross sections Figs. 11 and 12, the fourth disk is held in place by a cross slide 6 which is arranged across the fourth disk and across the central projection of the third disk, and the cross slide is secured by screws 60 to the central projection of the third disk. This confines the fourth disk and at the same time serves to support from the cross slide all of the four disks below it. The cross slide has a slot 61 which coöperates with the cam slot 40, as will hereinafter appear.

Next comes the fifth disk 5 (Figs. 13 and 14) which, as before stated, is stationary relatively to the templet positioning arm E. It is grooved at its under side at 50 with a groove corresponding to and engaged by the cross slide 6 so as to permit a relative sliding movement, and the cross slide and fifth disk are held together through headed screws or bolts 51 passing through slots formed at 52 in the fifth disk and screwed into the material of the cross slide 6. The fifth disk also has a downwardly projecting pin 53 which passes into the before mentioned slot 61 of the cross slide 6, and also in, so as to engage the cam slot 40 of the fourth disk, as is clear in Fig. 4. Above the fifth disk, as already mentioned, is the templet-carrying arm E, and the fifth disk is secured fast to the extremity of said arm through a bolt $e$ or the like passing through a bolt hole in the fifth disk and the templet-carrying arm with a nut $e^2$ and washer $e'$ for securing them together. By employing a central circular projecting portion 54 on the fifth disk engaging a corresponding recess on the arm E, different adjustments may be obtained simply by loosening the nut of the bolt $e$ and setting the fifth disk at any desired angle.

This substantially completes the description of the templet operating mechanism for a hand operated machine. The form of the cam slot of the fourth disk may of course be varied as to form or character to suit the conditions, if necessary. The special form of cam, which is best seen in Fig. 10, is one having a long concentric sweep with other apparently irregular portions which are designed to accomplish the special operation to be next described, and therefore further mention of the peculiarities of the cam may best be left to be taken up with the statement of operation. Suffice it to say here what will now be apparent, that the cam slot 40 engages not only the downwardly projecting pin 53 of the fifth disk, but also the upwardly projecting pin 23 of the second disk. As the fifth disk is fixed in relation to the templet-carrying arm, an oscillation of the fourth disk by means of the handle F′ will, because the cam 40 rotates while the pin 53 remains stationary, cause reciprocatory or reverse movements of the fourth disk and with it the cross slide 6 and the third, second and first disks; all of which will be guided by the engagement of the cross slide 6 with the cross slot formed in the under side of the fifth disk. This, however, would only occur when the pin 53 is engaged with an eccentric portion of the cam 40. When the pin 23 is engaged with an eccentric portion of the cam 40 and the fourth disk is oscillated, the result will be a reciprocatory movement of the second disk, and with it the first disk in a direction as guided by the engagement of the projections 21, 22 of the second disk with the corresponding grooves 30 of the third disk. In this way, by properly formed cams, the fold-defining plate of the templet secured to the first disk may be caused to reciprocate horizontally at one angle or direction for a given movement or range of movement of the operating handle; and along another line or direction for a different movement or range of movement of the operating handle.

Before stating the operation, a feature shown in Figs. 2 and 17 should be explained. This consists in forming the central portion of the bed slightly raised or elevated above the general level of the bed by suitable means, such, for example, as the plate $a$. By employing this arrangement the templet F and the blank when on the bed are slightly above the level which the infolders D normally assume. This permits the horizontal movements of the templet which have already been described, because the templet may then move over the tops of the infolders sufficiently for the purposes described. The edges of the plate $a$ are shown as beveled or inclined, and this serves to automatically elevate the infolders when they are forced inwardly so as to properly effect the folding of the blank edges. This feature of a raised central portion of a bed, however, I do not here claim, having made it the subject of another application.

*Description of operation.*—In describing the operation of the structure above set forth reference will be made particularly to Figs. 1, 9, and 17–20. The preferred way of operating the machine is as follows: With the templet-carrying arm elevated and the infolders in the outward position indicated in Fig. 1, the operator standing in front of the machine, places one or two plies of fabric forming the blanks in place upon the central portion of the bed with the edges of the blanks lying on top of the inner edges of the infolders. The fold-defining templet plate F being in normal position and its operating handle F′ extending forward, the templet will be lowered and will automatically be accurately positioned upon the blanks lying upon the bed with the edges of the fold-defining plate inward of the edges of the blanks and of course inward of the edges of the infolders, as shown in Fig. 1 where the blank itself is omitted for the sake of clearness. The templet being positioned, the next step is to move infolders. This is done by moving the ring B by means of the handle B'. Moving the handle to the right will give an oscillation in a direction opposite to the movement of the hands of a watch. During this movement the cam slot at the rear and right hand end of the machine will remain inoperative because engaged in their concentric portions. The cam slot at the left, however, will come into immediate operation to move inwardly the infolder slide $C^2$ at the left carrying the L-shaped infolder D from the left toward the right, thus folding the left end of the blank over the corresponding end of the templet. As the ring B continues the movement, it will next bring into play the cam and infolder slide C' at the front. This effects a movement from front to rear of the L-shaped infolder D, which serves to infold the long side edge of the blank at the front of the machine. At a later stage the other two blank edges will be infolded, but at this stage the infolding mechanism will temporarily cease operating. The templet mechanism now comes into operation. Figs. 10 and 21 show the templet in normal position for the adjustment I am describing. The pin 23 of the second disk is in the concentric portion of the cam slot 40 and remains there throughout the whole of the operation which I am now describing. The cam pin 53 of the fifth disk, however, is in engagement with an eccentric portion of the cam 40, as best seen in Fig. 21. The operator will now throw the templet handle F' to the right, which will serve to produce in the fold-defining plate F a diagonal movement toward the right rear of the machine. This movement is produced by the cam portion, which is shown in Fig. 18 as engaged by the pin 53. In this figure the operation will be understood by considering that disk 5 is stationary so that the oscillation of disk 4 in the direction opposite to the movement of the handle of a watch will cause disk 4, and with it disks 3, 2 and 1 and the fold-defining plate, to move as already stated in a diagonal direction that will accomplish the disengagement of the fold-defining plate from the folds at the left and front of the machine which have already been formed. Fig. 18 illustrates this stage of the process showing the appearance of the fold and the fold-defining plate withdrawn completely from the folds. It will be understood, however, that the infolder D is still in place above the infolds at the left and front, and has been omitted from Figs. 18–21 for the sake of clearness. The pressure producing mechanism will be brought into play. This operates through the presser heads $D^2$, which are depressed by the treadle $D^3$. The presser heads operate upon the infolder and cause it to squeeze with a very high pressure the folds of the blanks; and the bed being heated, this serves to fix the folds with a sharp crease so as to avoid danger of the same becoming open or distorted in the subsequent operations, or in the handling which the blanks undergo in the various subsequent processes which are employed in the making up of the finished cuff or other article. The infolders after pressing return outwardly. The templet will now be brought back to normal position by moving the handle F' again to the front. It will then be lowered upon the blanks upon the two folds already formed. When lowering the templet the second time it is better to first withdraw the infolder from above the blanks by returning the handle B' to its normal position. Fig. 19 shows the stage of operation at which we have now arrived. The two folds at the right and rear have yet to be formed. These two folds are formed, in a precisely analogous manner, by the L-shaped infolder D' and its two infolder slides $C^3$ and $C^4$ and the cams $b^3$, $b^4$, upon the ring B. These cams are so formed as to produce successive movements of the infolder slides when the handle B' is moved to the left. When these two infolds are formed and while the infolder is still above them, it will be seen that the fold-defining plate may be again withdrawn or slid out horizontally so as to disengage it from the new folds, as in Fig. 20. It is because the fold-defining plate is above the two infolds first formed that it may be slid out horizontally from the remaining infolds. After another creasing operation like that above described and the return or outward movement of the infolder, the machine will again be in normal position, at which time the folded blank, which is then complete as a blank, may be removed from the machine and a new one inserted.

*Second adjustment and operation.*—With the second adjustment the operation is more complicated, and all of the portions of cam 40 are brought into play. The difference in the first and second adjustments may be explained as follows. Fig. 21 shows the first adjustment. To change to the second adjustment, the screw 12, which passes through the slot 11 in the first disk and is embedded in the second disk, is temporarily loosened. The nut e' connecting the fifth disk with the templet-carrying arm is also loosened. This permits the second, third, fourth and fifth disks to be revolved to a new position. They are revolved in the direction of the movement of the hands of a watch to the extent of 45 degrees. Then the screw 12, which in Fig. 21 is seen at the right hand of the slot 11, is transferred to the left hand of the slot 11, as seen in Fig. 22. The result of this is as follows: As seen in Fig. 5, the lugs 21, 22 of disk 2 are at a slant of 45 degrees to the general direction of the length of the machine or of the long sides of the blanks. The cross slide 6, which is rigid with disk 3, is also at an angle of 45 degrees but at right angles to the slides 21, 22. This is clearly seen by the dotted lines in Fig. 21. When the second, third and fourth disks are adjusted to their second position, as described, the slides 21, 22 and the cross slide 6 assume the positions shown in dotted line in Fig. 22, that is parallel and at right angles respectively to the long sides of the fold-defining plate of the templet.

The construction otherwise being the same, the operation will now be described with the second adjustment.

Fig. 22 shows the normal position of the parts with the fold-defining plate resting upon a blank. The left hand infolder will now be operated to fold the left end of the blank. The templet handle will then be moved to the right, as shown in Fig. 23, with the result of moving the fold-defining plate to the right. During this operation the pin 23 remains in a concentric part of the cam 40 while the pin 53 is moving in the eccentric portion, which effects the movement described. This movement effects the disengagement of the templet from the fold at the left of the blank. Pressure may now be applied, or it may be applied at a later stage, as preferred. The templet is elevated. The handle F' is moved to the left to normal position. The templet is again lowered upon the blanks. The infolder operation mechanism is again brought into play to infold the front edge of the blank. The templet handle is again moved from left to right as before, but to a farther distance and to the position shown in Fig. 24. During this movement the pin 23, by its engagement with the cam 40, is forced rearwardly, which carries the fold-defining plate rearwardly so as to disengage it from the fold, as seen in Fig. 24. The templet is again elevated and brought to normal position, but this time by moving the handle F' farther to the right until the pin 23 reaches the last bend of the cam 40; that is, until the pin becomes engaged in the bend of the cam which is seen in Fig. 24 as lying between the extreme end of cam 40 and the bend thereof which in Fig. 24 is occupied by the pin 23. The templet is again lowered upon the blanks. The rear edge of the blanks is infolded. The blanks and templet are again disengaged by a still further movement of the handle F' toward the right. This position is shown in Fig. 25 in which the pin 23 has reached the extreme end of the cam 40; the pin 53 in the meanwhile remaining inoperative because in a concentric portion of the cam. The templet is again elevated and returned to normal position by swinging it away around to the left to the original position shown in Fig. 22. The templet is lowered upon the blanks and upon the three folds already formed. The infolder at the right is operated to fold the right end of the blanks. The fold and templet are disengaged by throwing the handle F' to the extreme left in the position shown in Fig. 26. The templet may now be elevated and pressure applied, if it has not been applied following each stage of the operation. The resultant blank is shown in Fig. 27, and is the same as the blank produced by the operation described in connection with the first adjustment. Any two of such blanks may be interlocked. Of course other forms of lock corners may be formed by suitable and obvious changes and adjustments in the mechanism already described.

Figure 29:
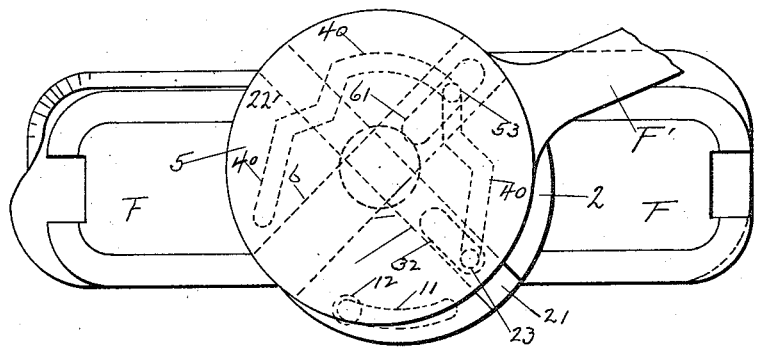
Figure 30:
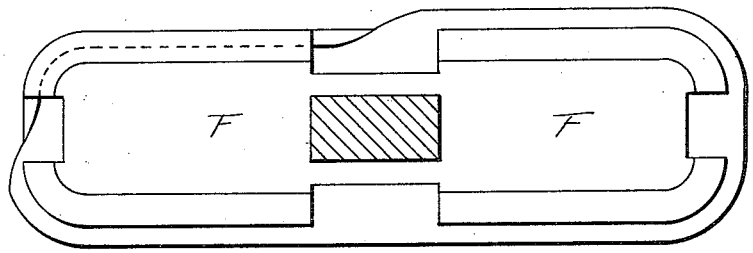
Figure 31:
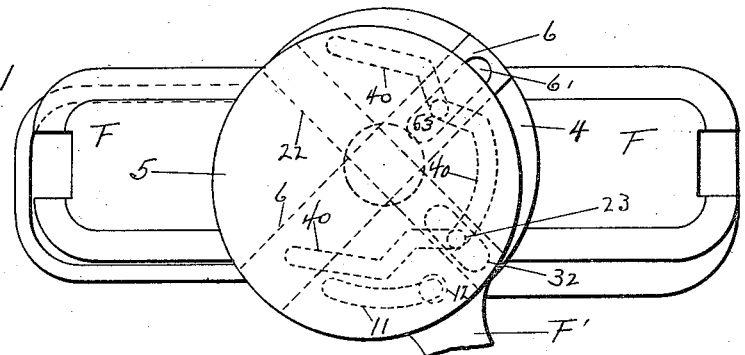
Figure 32:
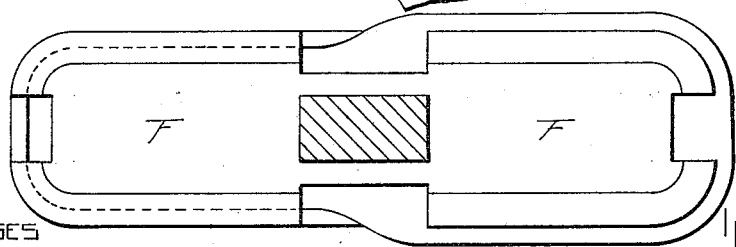

*Second modification.*—This is shown in Figs. 28–37. It is one adapted to the infolding of a cuff having four rounded corners. The shape of the fold-defining plate is illustrated in Fig. 28 wherein spaces are cut out at the sides and ends for a purpose that will soon appear. The top view in Fig. 37 shows four separate infolders $D^5$, $D^6$, $D^7$ and $D^8$, slides $C^5$, $C^6$, $C^7$ and $C^8$; also operating cams $b^5$, $b^6$, $b^7$ and $b^8$ capable of moving the infolders and slides inwardly successively beginning with $C^6$ then $C^7$, $C^8$ and $C^5$. This is rendered possible with the form of the operating cams illustrated by reason of the large ring B on which the cams are mounted being cut into two portions as seen in Fig. 37, each of which has an independent handle B' whereby the two ring portions may be operated consecutively. The templet disks 2, 3, 4, and 5 are in the same adjustment as shown in Figs. 18–21. The fold-defining plate, as explained, is then capable of independent diagonal movements in reverse directions along each of the two diagonals. The operation of the handle F' has been so fully described that a brief description will now suffice. The templet is first brought centrally upon the blanks. The left hand rear corner is infolded by a diagonal movement of infolder $D^6$ and then the handle F' is operated to move the fold-defining plate forward and toward the right. This diagonal movement disengages it from the fold already formed, as seen in Fig. 29. It will now be clear why spaces are cut away at the sides and ends of the fold-defining plate. It is because in the first stage of operation just described, when a corner is infolded, the fold runs only part way down the side and end. The templet may now be elevated, and owing to the cut away portions, returned to normal position and lowered upon the fold already formed, while adequately serving to define the folds not yet formed. In this stage it may be seen in Fig. 30. The next operation is to infold the front left hand corner when the plate is similarly disengaged, as seen in Fig. 31. After being elevated, the plate is again returned to normal position and lowered upon the blanks, as shown in Fig. 32. The front right hand corner is next infolded and the plate withdrawn, as seen in Fig. 33. The templet is again elevated and returned to normal position, and again lowered upon the blanks, as seen in Fig. 34. The fourth and last corner of the blank is now infolded. The templet is again withdrawn, as seen in Fig. 35, and the result will be a completely folded blank, as shown in Fig. 36. Fig. 38 shows a combination of round and lock corners which may be folded by operations analogous to the above.

*Third modification.*—This modification differs from the first and second in certain details of construction, while the principles of the operation remain the same. It is peculiarly useful for a long and narrow blank. As the cam slot 40 in disk 4 needs to be longer in extent I have shown an extension 49 in the metal, into which the slot continues. This is to give an excessive forward throw of the plate F, the pin 23 riding into the extension of slot 40 while the pin 53 is in a concentric portion.

The operation is as follows: The plate F is positioned on the blanks; folds are formed on each end and the rear, as by two diagonally moving L-shaped infolders. The templet handle F' being then thrown to the right, the pin 23 rides to the end of slot 40, throwing the plate F forward excessively and leaving not only the three folds but the entire blank free of the templet, as seen in Fig. 39. The templet is then raised, restored to central position, and lowered, when another infolder will fold the fourth side, after which a slight movement of handle F' to the left will free the fourth fold as seen in Fig. 40. The pin 53 serves no function in this operation. The completed blank is as shown in Fig. 41.

By "integral in its width" and "integral in its length" in some of the claims herein, it is intended that the templet is substantially rigid or non-contractible in that direction, that is, there is no such contractibility as to withdraw from the folds.

Reference is hereby made to a prior application of this applicant, namely, No. 216,822, filed July 16, 1904, and of which in part this application forms a continuation, since Figs. 28 and 29 of application 216,822, disclose a form which like Figs. 39 and 40 of the present application, disclose a templet that is integral or non-contractible both endwise and sidewise, that is in all horizontal directions, and which is capable of integral movement in two directions along a given horizontal line for the purpose of extraction from some of the folds, so as to permit the subsequent replacement and the formation of further folds and the final extraction from the last formed folds. In application 216,822, none of the claims refer to a templet which is integral or non-contractible both lengthwise and sidewise, a machine so characterized being reserved for the present application.

What I claim and desire to secure by Letters Patent is:

1. In a blank-edge infolding-machine, the combination of a blank support, a templet which is substantially integral both in its width and length and whose outline is the same as and serves for defining the outline of the folded blanks, mechanical means for guiding the templet in its movements to and from the support, infolding mechanism for successively infolding different edge portions of a given blank, and mechanism for effecting relative horizontal movement between templet and support in at least two directions from the normal folding position, whereby the templet may be successively disengaged from the different blank folds and repositioned thereon in normal position until the blank is completely folded.

2. In a blank-edge infolding-machine, the combination of a blank support, a templet which is substantially integral both in its width and length and whose outline is the same as and serves for defining the outline of the folded blanks, mechanical means for guiding the templet in its movements to and from the support, infolding mechanism for successively infolding different edge portions of a given blank, mechanism for effecting relative horizontal movement between templet and support in at least two directions from the normal folding position, whereby the templet may be successively disengaged from the different blank folds and repositioned thereon in normal position until the blank is completely folded, and means for creasing folds by pressure between support and infolders.

3. In a blank-edge infolding-machine, the combination of a blank support, a templet which is substantially integral both in its width and length and whose outline is the same as and serves for defining the outline of the folded blanks, mechanical means for guiding the templet in its movements to and from the support, infolding mechanism for successively infolding different edge portions of a given blank, and mechanism for bodily shifting the templet horizontally in at least two directions from the normal folding position, whereby the templet may be successively disengaged from the different blank folds and repositioned thereon in normal position until the blank is completely folded.

4. In a blank-edge infolding-machine, the combination of a blank support, a templet consisting of a single plate the same size and shape as the finished blank, mechanical means for guiding the templet in its movements to and from the support, infolding mechanism for successively infolding different edge portions of a given blank, and mechanism for effecting relative horizontal movement between the templet and support in at least two directions from the normal folding position, whereby the templet may be successively disengaged from the different blank folds and repositioned thereon in normal position until the blank is completely folded.

5. A blank-edge infolding-machine comprising in combination, a support for the blanks, infolders, a templet having a constant blank-defining periphery or outline, positioning mechanism therefor, mechanism whereby said templet may be given to and fro movements along two horizontal lines in sequence; whereby the templet may be extracted from the folds first formed over it and again positioned on the same blank so as to define the yet unfolded edge portions thereof, and mechanism for operating said infolders in sequence in accord with the templet movements, substantially as described.

6. A blank-edge infolding-machine comprising in combination, a support for the blanks, infolders, a templet having a constant blank-defining periphery or outline, positioning mechanism therefor, mechanism whereby said templet may be given to and fro movements along two horizontal lines in sequence, and a circular slide and cams for operating said infolders in sequence in accord with the templet movements, substantially as described.

7. A blank-edge infolding-machine comprising in combination, a support for the blanks, infolders, a rigid fold-defining templet, positioning mechanism therefor, mechanism whereby said templet may be given to and fro movements along two horizontal lines in sequence, and duplicate half rings with cams actuated thereby for operating said infolders in sequence in accord with the templet movements, substantially as described.

8. A blank-edge infolding-machine comprising in combination, a support for the blanks, infolders, mechanism for operating said infolders dissimultaneously, a rigid fold-defining templet, positioning mechanism therefor, mechanism whereby said templet may be given to and fro movements along either of two horizontal lines extending at angles to each other, and adjustment devices whereby the direction of horizontal movement may be altered, substantially as described.

9. A blank-edge infolding-machine comprising in combination, a support for the blanks, infolders, mechanism for operating said infolders dissimultaneously, a rigid fold-defining templet, positioning mechanism therefor, mechanism including guiding means whereby said templet may be given to and fro movements along two horizontal lines extending at angles to each other, and adjustment devices whereby the guiding means may be adjusted from rectangular directions to diagonal directions with respect to the longitudinal axis of the templet, substantially as described.

10. A blank-edge infolding-machine comprising in combination, a support for the blanks, a templet having a constant blank-defining periphery, a carrying part therefor, infolding mechanism for folding the edges in succession, and mechanism for effecting movements of said templet in a plurality of horizontal directions, whereby the templet may be successively disengaged from the different blank folds and repositioned thereon for a succeeding folding.

11. A blank-edge infolding-machine comprising in combination, a support for the blanks, infolders, mechanism whereby the infolders may be dissimultaneously operated in harmony with the templet movements, a rigid templet, a carrying part therefor, and mechanism for effecting movements of said templet in horizontal directions; said mechanism comprising a plurality of horizontal disks and a cam actuating handle for rotating one disk relatively to another.

12. A blank-edge infolding-machine comprising in combination, a support for the blanks, infolders, mechanism whereby the infolders may be dissimultaneously operated in harmony with the templet movements, a rigid templet, a carrying part therefor, and mechanism for effecting movements of said templet in horizontal directions; said mechanism comprising a series of disks in mutual contact, with cam and pin devices and a part for causing the cam to come into play, whereby the horizontal movements of said templet may be regulated.

13. A blank-edge infolding-machine comprising in combination, a support for the blanks, infolders, mechanism whereby the infolders may be dissimultaneously operated in harmony with the templet movements, a rigid templet, a carrying part therefor, and mechanism for effecting movements of said templet in horizontal directions; said mechanism comprising a series of superimposed horizontal disks in mutual face contact, one disk having a handle and operatively connected by a cam with another disk, substantially as described.

14. A blank-edge infolding-machine comprising in combination, a support for the blanks, infolders, mechanism whereby the infolders may be dissimultaneously operated in harmony with the templet movements, a rigid templet, a carrying part therefor, and mechanism for effecting movements of said templet in horizontal directions; said mechanism including a horizontal cam disk or plate, with operative connections extending to the templet, and means for operating it.

15. A blank-edge infolding-machine comprising in combination, a support for the blanks, infolders, mechanism whereby the infolders may be dissimultaneously operated in harmony with the templet movements, a rigid templet, a carrying part therefor, and mechanism for effecting movements of said templet in horizontal directions; said mechanism including a horizontal cam disk or plate having double connections with other disks whereby it may effect horizontal movements of said templet along two lines in sequence.

16. A blank-edge infolding-machine comprising in combination, a support for the blanks, infolders, mechanism whereby the infolders may be dissimultaneously operated in harmony with the templet movements, a rigid templet, a carrying part therefor, and mechanism for effecting movements of said templet in horizontal directions; said mechanism including a series of horizontal disks superimposed one upon the other, the lower disk rigid with the templet, the upper disk rigid with its carrying arm, and the intermediate disks adapted for effecting and regulating the horizontal movements of said templet.

17. A blank-edge infolding-machine comprising in combination, a support for the blanks, infolders, mechanism whereby the infolders may be dissimultaneously operated in harmony with the templet movements, a rigid templet, a carrying part therefor, and mechanism for effecting movements of said templet in horizontal directions; said mechanism including a series of horizontal disks superimposed one upon the other, the lower disk rigid with the templet, the upper disk rigid with its carrying arm, and the intermediate disks operative for the purpose of effecting and regulating the horizontal movements of said templet; one of said intermediate disks having a handle or the like and cam slots, with pins projecting into said slots from above and below.

18. A blank-edge infolding-machine for folding cuff blanks having four round or crush corners or the like, comprising in combination, a support for the blanks, a templet having a constant blank-defining periphery or outline having cut away areas intermediate the corners thereof substantially as described, templet positioning mechanism, mechanism for producing horizontal movements in reverse directions of said templet along a diagonal and subsequently along another diagonal, whereby the blank corners may be folded in sequence substantially as described, infolders, and mechanism for operating the infolders in harmony with the templet movements.

In witness whereof, I have signed my name to this specification in the presence of two subscribing witnesses, on this 16th day of January A D., 1907.

GARRY J. DORMANDY.

In presence of—
  GEO. L. WHEELOCK,
  OLIVE B. KING.

---

Copies of this patent may be obtained for five cents each, by addressing the "Commissioner of Patents, Washington, D. C."